3,345,383
CONVERSION OF ALKYLPHENOLS TO
THIAINDANES
Paul B. Venuto, Cherry Hill, N.J., assignor to Mobil Oil
Corporation, a corporation of New York
No Drawing. Filed Feb. 24, 1966, Ser. No. 529,633
4 Claims. (Cl. 260—330.5)

ABSTRACT OF THE DISCLOSURE

Catalytic vapor phase process for converting 2-ethylphenol or substituted derivatives to thiaindane or derivatives thereof in the presence of hydrogen sulfide. The catalyst comprises a crystalline aluminosilicate having a uniform pore diameter between 6 and 15 angstrom units and at least one component from the group sulfur, selenium, tellurium and compounds thereof.

---

This invention relates to the preparation of thiaindanes. It is more particularly concerned with a vapor phase process for converting 2-alkylphenols to thiaindane (2,3-dihydrobenzothiophene) and substituted derivatives thereof.

It is well known in the art that thiaindane and its derivatives is readily dehydrogenated with sulfur to form benzothiophene and derivatives thereof. Benzothiophene is an intermediate in the manufacture of thioindigoid dyestuffs. Ring-substituted derivatives, such as 4-hydroxybenzothiophene, are intermediates for making a very effective class of pesticides. Thus, typical methods for converting 4-hydroxybenzothiophene to benzothienyl carbamate pesticides are set forth in copending application Ser. No. 487,333, filed Sept. 14, 1965, now U.S. Patent No. 3,288,673, a continuation-in-part of application Ser. No. 427,089, filed Jan. 21, 1965, now U.S. Patent No. 3,288,808, a continuation-in-part of application Ser. No. 334,581, filed Dec. 30, 1963, now abandoned, a continuation-in-part of application Ser. No. 220,073, filed Aug. 28, 1962, now abandoned.

It has now been found that thiaindanes can be produced in high yields by a process that is simple and economically feasible. It has been discovered that thiaindanes can be so produced by a process involving contacting a 2-alkylphenol reactant with a catalyst comprising a crystalline aluminosilicate and a sulfur, selenium, or tellurium component, in the presence of hydrogen sulfide.

Accordingly, it is a broad object of this invention to provide an improved process for producing thiaindane and derivatives thereof. Another object is to provide an improved vapor phase catalytic process for producing thiaindanes. A specific object is to provide a vapor phase process for producing thiaindanes by contacting a 2-alkylphenol reactant with a sulfur, selenium, or tellurium containing crystalline aluminosilicate catalyst in the presence of hydrogen sulfide. Other objects and advantages of this invention will become apparent to those skilled in the art, from the following detailed description.

This invention provides a method for producing thiaindanes and substituted derivatives thereof that comprises contacting a phenol reactant having the formula:

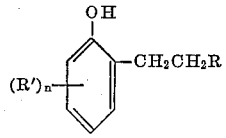

wherein R is hydrogen or lower alkyl ($C_1$–$C_4$), R' is selected from the group consisting of lower alkyl ($C_1$–$C_4$), aryl, halogen, cyano, and nitro, and $n$ is 0 to 3, and hydrogen sulfide with a catalyst comprising a crystalline aluminosilicate having a uniform pore diameter between 6 and 15 angstrom units and at least one component selected from the group consisting of sulfur, selenium, tellurium and compounds thereof.

The phenol compound reactant is a 2-alkylphenol having the aforedefined formula. As indicated above, the phenol compound reactant can contain one or more substituent groups on the benzene ring. Non-limiting examples of the phenol reactant are 2-ethylphenol; 2-butylphenol; 2-isopropylphenol; 2-(3-methylbutyl)phenol; 2-(3,3-dimethylbutyl)phenol; 2 - hexylphenol; 2 - ethyl-4-chlorophenol; 2-propyl-5-bromophenol; 2-hexyl-4,5-dichlorophenol; 2-ethyl-6-cyanophenol; and 2-isopropyl-5-nitrophenol. The 2-ethylphenols, which can have a substituent or substituents R' as aforedefined, are preferred phenol compound reactants.

In the process of this invention an excess over the stoichiometric amount of hydrogen sulfide is used. In practice the molar ratio of hydrogen sulfide to phenol reactant will be between about 2:1 and about 10:1.

The process can be carried out in the vapor phase at temperatures between about 300° C. and about 600° C. The greatest selectivity, although at lower yield per pass, appears to occur at temperatures between about 300° C. and about 400° C. The phenol reactant is charged at an LHSV (liquid volume per volume of catalyst per hour) of between about 0.5 and about 10. The process proceeds readily at atmospheric pressures although superatmospheric pressure can be employed. The process can be operated batchwise, but continuous operation is preferred, recycling unreacted phenol reactant to extinction.

The catalysts used in the process of this invention comprise crystalline aluminosilicate having a uniform pore diameter between 6 and 15 angstrom units and at least one component selected from the group consisting of sulfur, selenium, tellurium, and compounds thereof. These catalysts are fully described in copending application Ser. No. 232,874, filed Oct. 24, 1962, now abandoned and a continuation-in-part application thereof Ser. No. 430,466, filed Feb. 4, 1965 now abandoned. Reference can be made to these applications for such description.

Example

Two runs were carried out at atmospheric pressure, using a catalyst bed of Te containing Zeolite 13X (type X aluminosilicate having an average pore diameter of about 13 angstrom units) heated to the desired run temperature. In each run, 2-ethylphenol was charged at an LHSV of 2.0 and hydrogen sulfide was charged in a molar ratio of hydrogen sulfide to 2-ethylphenol of 7:1. Pertinent data are shown in the following tabulation:

| Temp., ° C. | Percent Conversion | Thiaindane | Ultimate Yield [1] |
|---|---|---|---|
| 350 | 8.8 | 3 | 33 |
| 500 | 23.6 | 4 | 16 |

[1] Wt. percent yield thiaindane obtained by recycling unreacted 2-ethylphenol to extinction.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

What is claimed is:
1. A method for producing thiaindanes and substituted derivatives thereof that comprises contacting a phenol reactant having the formula:

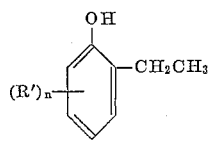

wherein R' is selected from the group consisting of lower alkyl ($C_1$–$C_4$), halogen, cyano, and nitro, and $n$ is 0 to 3, and hydrogen sulfide with a catalyst comprising a crystalline aluminosilicate having a uniform pore diameter between 6 and 15 angstrom units and at least one component selected from the group consisting of sulfur, selenium, tellurium and compounds thereof.

2. The method defined in claim 1, wherein said phenol reactant is 2-ethylphenol.

3. The method defined in claim 1, wherein said catalyst comprises a crystalline aluminosilicate having a uniform pore diameter of about 13 angstrom units and a tellurium component.

4. The method defined in claim 3, wherein said phenol reactant is 2-ethylphenol.

No references cited.

WALTER A. MODANCE, *Primary Examiner.*

C. M. SHURKO, *Assistant Examiner.*